(12) United States Patent
Kang et al.

(10) Patent No.: US 6,468,331 B2
(45) Date of Patent: Oct. 22, 2002

(54) SOLID STATE FACILITATED TRANSPORT SEPARATION MEMBRANES USING POLYMER ELECTROLYTES FOR ALKENE SEPARATION

(75) Inventors: Yong-Soo Kang, Seoul (KR); Jong-Ok Won, Seoul (KR); Seong-Uk Hong, Taejeon (KR)

(73) Assignee: Korea Institute of Science and Technology, Seoul (KR)

( * ) Notice: Subject to any disclaimer, the term of this patent is extended or adjusted under 35 U.S.C. 154(b) by 0 days.

(21) Appl. No.: 09/749,904

(22) Filed: Dec. 29, 2000

(65) Prior Publication Data

US 2001/0013273 A1 Aug. 16, 2001

(30) Foreign Application Priority Data

Dec. 30, 1999 (KR) .............................................. 99-65669

(51) Int. Cl.⁷ .......................... B01D 53/22; B01D 69/12
(52) U.S. Cl. ........................ 96/12; 96/4; 96/13
(58) Field of Search ..................... 95/44, 45, 50; 96/4, 5, 11–13

(56) References Cited

U.S. PATENT DOCUMENTS

| 3,758,603 A | 9/1973 | Steigelmann et al. ... 260/677 A |
| 3,758,605 A | 9/1973 | Hughes et al. .......... 260/677 A |
| 4,318,714 A | 3/1982 | Kimura et al. ................. 55/16 |
| 4,614,524 A | 9/1986 | Kraus ............................. 55/16 |
| 4,617,029 A * | 10/1986 | Pez et al. ....................... 95/44 |
| 4,627,859 A * | 12/1986 | Zupancic et al. .............. 96/13 |
| 4,741,744 A * | 5/1988 | Wu et al. .................. 95/50 X |
| 4,761,164 A * | 8/1988 | Pez et al. ....................... 95/44 |
| 4,766,229 A * | 8/1988 | Kobayashi et al. ......... 95/44 X |
| 4,780,114 A * | 10/1988 | Quinn et al. ................... 95/44 |
| 5,015,268 A | 5/1991 | Ho ................................. 55/16 |
| 5,045,357 A * | 9/1991 | Motonaga et al. .......... 95/12 X |
| 5,062,866 A | 11/1991 | Ho ................................. 55/16 |
| 5,611,843 A * | 3/1997 | Ho ............................. 96/13 X |
| 5,670,051 A * | 9/1997 | Pinnau et al. ............. 95/45 X |
| 6,207,038 B1 * | 3/2001 | Steil et al. ................. 95/45 X |

FOREIGN PATENT DOCUMENTS

| JP | 54-101393 | * 8/1979 | .................... 96/11 |
| JP | 60-064601 | * 4/1985 | .................... 96/12 |

* cited by examiner

*Primary Examiner*—Robert H. Spitzer
(74) *Attorney, Agent, or Firm*—Oblon, Spivak, McClelland, Maier & Neustadt, P.C.

(57) ABSTRACT

A solid state facilitated transport separation membrane prepared by forming a polymer electrolyte layer consisting of a polymer and a metal salt to a porous membrane having good permeance and mechanical strength; the polymer electrolyte facilitated transport separation membrane thus prepared is characterized in that the permeance and selectivity to alkene hydrocarbons is high, and that the complex is formed by a polymer ligand and a metal in the polymer electrolyte maintains its activity as a carrier of alkene even under dry operation.

12 Claims, No Drawings

SOLID STATE FACILITATED TRANSPORT SEPARATION MEMBRANES USING POLYMER ELECTROLYTES FOR ALKENE SEPARATION

BACKGROUND OF THE INVENTION

1. Field of the Invention

The present invention relates to a solid state facilitated transport separation membrane for the separation of alkenes prepared by using a polymer electrolyte, wherein the membrane has high permeance and selectivity of alkene-series hydrocarbons even under dry conditions. More specifically, the present invention relates to a solid state facilitated transport separation membrane prepared by coating a polymer electrolyte layer consisting of a metal salt and a polymer onto a porous supported membrane, wherein the separation membrane is characterized in that its permeance and selectivity to alkenes is high and in that the complex formed by a polymer ligand in the polymer electrolyte maintains its activity as a carrier for alkene-series hydrocarbons for a long time, even under dry conditions.

2. Description of the Prior Art

Alkene-series hydrocarbons, such as ethylene and propylene, are important raw materials that form the basis of the current petrochemical industry. They are primarily produced by high temperature thermal decomposition of naphtha that is obtained from a purification process of petroleum. However, since alkane-series hydrocarbons such as ethane and propane are also produced by this process of thermal decomposition, use of alkene-series hydrocarbons as raw materials should be preceded by the separation process of mixtures having alkene-series hydrocarbons. Currently, a sub-zero distillation process is generally used in the separation of these mixtures. For example, a column having at least 100 trays of theoretical number at a low temperature of −25° C. and at a high pressure of about 23 atm is required in the sub-zero distillation process to separate the mixture of ethylene/ethane. In the separation of propylene/propane, similar operation conditions are also required. Therefore, there has been a continued need for the development of a new separation process that can replace the prior distillation process, which requires investment of large-scale equipment and high-energy costs.

A separation process that could be considered as a replacement for distillation processes is one that uses a separation membrane. The separation membrane process has progressed remarkably over the past few decades in the field of separating nitrogen/oxygen, nitrogen/carbon dioxide and nitrogen/methane, and the like. In the separation of mixtures, such as alkenes/alkanes, however, a satisfactory separation performance cannot be accomplished by using general polymer separation membranes because they are similar in both molecular size and in such physical properties as the degree of condensation.

The process utilizing the separation membrane that uses the concept of facilitated transport could be considered as an alternative process. Facilitated transport refers to a transport phenomenon in which the general mass transport according to Fick's law and the mass transport mediated by a carrier occur simultaneously. A supported liquid membrane is one membrane prepared by using such a concept. This membrane facilitates said mass transport by filling a porous membrane with a solution containing a carrier. Supported liquid membranes of this type have succeeded to a certain extent but have drawbacks in that solvent is gradually lost and permeance is gradually reduced over time. By using a membrane of this type, for example, Steigelmann and Hughes prepared a supported liquid membrane wherein the selectivity of ethylene/ethane is about 400 to 700 and the permeance of ethylene is 60 GPU [1 GPU=1×10$^{-6}$ cm$^3$ (STP)/cm$^2$ sec cmHg] (see, U.S. Pat. Nos. 3,758,603 and 3,758,605). These values show considerably good results, but there remains the problem that such a state cannot be maintained for an extended period of time due to the aforementioned solvent loss.

To solve this problem of the supported liquid membrane, a method which enables facilitated transport by substituting a suitable ion in an ion exchange resin was proposed by Kimura, et al. (see U.S. Pat. No. 4,318,714). However, this ion exchange resin membrane also has a drawback in that the facilitated transport phenomenon is exhibited only under humid conditions, which is similar to the supported liquid membrane. This membrane, which must always be maintained in humid conditions, is inconvenient and inefficient in the actual separation process. Also, a carrier loss into the aqueous phase can still occur, as with the supported liquid membrane.

Another method proposed by Ho is a process for producing a complex by using water-soluble glassy polymers, such as polyvinylalcohol (see U.S. Pat. Nos. 5,015,268 and 5,062,866). However, this method also had a drawback in that satisfactory results can be obtained only where feed gas is saturated with water vapor by passing it through water, or where the membrane is swelled by using ethylene glycol or water.

Kraus, et al. also have developed a facilitated transport separation membrane by using a similar method (see U.S. Pat. No. 4,614,524). According to this patent, an Ag ion is substituted for an ion exchange membrane, such as Nafion, and said membrane is then plasticized, for example, with glycerol. However, this membrane could not be utilized because the selectivity of ethylene/ethane is as low as about 10 when dry feed was used. And when a plasticizer was not used, the selectivity could not be seen.

Thus, the development of a solid state facilitated transport separation membrane in which selectivity and permeance are high and stable even under dry operating conditions is sincerely required in the separation of alkene/alkane hydrocarbons.

Considering that the usual polymer separation membrane cannot separate alkene/alkane mixtures having similar molecular size or physical properties, as described above, use of a facilitated transport separation membrane capable of selectively separating only alkene hydrocarbons is needed. The conventional facilitated transport separation membranes, however, have a disadvantage in that the mobility of a carrier should be increased by using the following method: filling a solution containing a carrier into a porous membrane, adding a plasticizer or saturating feed gases with water vapor, etc. Such a conventional facilitated transport separation membrane cannot be utilized due to the problem of declining stability of the membrane, since the materials added are gradually lost with time. There is also the problem of having to remove water that is contained in the feed before the preparation of the product.

SUMMARY OF THE INVENTION

Therefore, the purpose of the present invention is to prepare a facilitated transport separation membrane by introducing, for example, the polymer electrolytes used in polymer batteries into the facilitated transport separation membrane, wherein the problem of stability, such as with carrier loss, is solved and unsaturated hydrocarbons such as alkene can be separated even under dry conditions.

That is, an object of the present invention is to prepare a solid state facilitated transport separation membrane for use in the separation of alkene-series hydrocarbons from alkenes/alkanes mixtures, wherein the separation membrane has high permeance and selectivity for alkene-series hydrocarbons under dry operating conditions.

DETAILED DESCRIPTION OF THE INVENTION

This object of the present invention is accomplished through the use of a solid state facilitated transport composite separation membrane; said membrane consisting of a porous supported membrane and a polymer electrolyte layer consisting of a metal salt and a polymer, wherein the composite separation membrane has an ideal selectivity expressed by [permeance of pure alkenes/permeance of pure alkanes] of at least 100.

The present invention is described in greater detail below.

The solid state facilitated transport separation membrane according to the present invention is composed of a polymer electrolyte having a selective permeance for alkene-series hydrocarbons and a porous supported membrane supporting it.

Any supported membrane having good permeance and sufficient mechanical strength can be used in the present invention. For example, both a conventional porous polymer membrane and a ceramic membrane may be used. Plate type, tubular type, hollow fiber type, capillary type or other types of supported membranes may also be used.

The polymer electrolyte used in the present invention is composed of a polymer and a metal salt. The metal salt in the electrolytes is not simply dispersed or mixed in the polymers, but is dissociated into a cation of metals and an anion of salts on the polymer. Contrary to conventional membranes, the solid state facilitated transport separation membrane of the present invention does not require the addition of water to maintain the activity of the carrier and other materials to swell the polymer matrix, and it selectively facilitates the transport of alkene feed under dry conditions.

That which substantially affects the selective separation of alkene-series hydrocarbons in the solid state facilitated transport separation membrane according to the present invention is a polymer electrolyte containing a carrier (a metal ion), wherein the permeation selectivity of alkene-series hydrocarbons from the corresponding alkane-series hydrocarbons is determined according to the properties of the electrolyte.

A metal salt used in the present invention is composed of a cation of metal and an anion of salt, and, therefore, they are dissociated with ions on the polymer. As a result, the metal ion directly takes part in the facilitated transport via reversible reaction with the double bond of alkene-series hydrocarbons. When alkene-series hydrocarbons are facilitated-transported in the polymer electrolyte, it is possible to interact the metal ion with the anions of salt, the electron donor in the polymer ligands and the electron of the alkene-series hydrocarbons. Accordingly, the polymer, the cation of metals, and the anion of salts must be properly selected to obtain a membrane with high selectivity and permeance.

The polymer used in the invention must easily form a complex with the metal salt as mentioned above to allow the reversible interaction of the metal cation with alkenes. A polymer having a heteroatom that can form a covalent bond with a metal ion may be considered as one such polymer.

In the present invention, the polymers containing a nitrogen atom or amide group in the repeat unit are preferred among the above polymers. Here, nitrogen or oxygen atoms coordinate with metal atoms to make complexes. These polymers are poly(ethylene imine), poly(alkyl oxazoline), poly(vinyl pyrrolidone), poly(acryl amide), poly(N-isopropyl acryl amide), etc., but the invention is not limited to the polymers described herein.

Next, the metal salts to be used as carriers are described. In the present invention, as mentioned above, the transport of alkenes is selectively facilitated, which results from the metal ion which has formed a complex with a polymer ligand in the polymer electrolyte reacting reversibly with alkene-series hydrocarbons.

As cations of the metal in the present invention, silver and copper, known as readily forming complexes with alkene-series hydrocarbons, are preferred, and tetrafluoroborate, trifluoromethane acetate, trifluoromethane sulfonate and hexafluorophosphate, etc. are preferred as anions of the metal salts. Further, metal salt, such as silver tetrafluoroborate ($AgBF_4$), silver trifluoromethane sulfonate ($AgCF_3SO_3$), silver trifluoromethane acetate ($AgCF_3CO_2$) and silver hexafluorophosphate ($AgPF_6$), are preferably used in the present invention as carriers which facilitate the transport of alkene-series hydrocarbons in the polymer electrolytes, but the invention is not limited to the metal salts illustrated herein.

The following describes a process for the preparation of the solid state facilitated transport separation membrane of the invention.

The solid state facilitated transport separation membrane of the present invention is prepared first by dissolving a transition metal salt and a polymer constituting a polymer electrolyte in a liquid solvent to form a coating solution, applying the solution onto a porous supported membrane and then drying it. The liquid solvent used in the process can be any that can dissolve the transition metal and polymer without impairing the supported membrane. If the polymer constituting the solid electrolytes is water-soluble, water is used as a solvent. The concentrations of metal salts and polymers in the coating solution are determined by considering the thickness of the polymer electrolytes solution formed directly after application and the thickness after drying.

For example, blade/knife coating, Mayer bar coating, dip coating, air knife coating, and the like can be used as the method by which the polymer electrolyte solution is applied to the supported membrane. The thickness of the polymer electrolyte formed on the supported membrane after drying is preferably as thin as possible to enhance permeance.

The solid state facilitated transport separation membrane according to the invention is suitable for application to the actual separation process for alkenes/alkanes because: the selectivity for alkene-series hydrocarbons is high, being at least 100 of the ideal selectivity expressed by [permeance of pure alkene/permeance of alkane]; the activity of a carrier is maintained even under completely dry operating conditions; and the long-term operation stability is high.

The examples below illustrate the present invention in detail, but the invention is not limited to the scope thereof.

EXAMPLE 1

A solution containing 1 g of poly(2-ethyl-2-oxazoline) (PEOx) (Mw 500,000, $T_g$=60°C., Aldrich Co., Milwaukee, Wis.), 99 g of water and 2 g of silver tetrafluoroborate (AgBF$_4$) was prepared. The resulting solution was coated onto a polysulfone porous asymmetric supported membrane of a plate type [supplied by Saihan, Ltd.] by using a Mayer bar to make a composite membrane. The composite membrane was placed in a vacuum oven and completely dried at 40°C. The facilitated transport separation membrane thus prepared contained 67 wt % of Ag salt and included a coating layer of electrolyte having a thickness of about 1 $\mu$m.

The membrane was cut to the size of 2×2 cm$^2$ and the gas permeance of the pure propylene and propane was assessed. The measurement of permeance was carried out at room temperature under conditions in which the pressure of a feed was 60 psig and the pressure of permeation was 0 psig. The volume flow rate was determined by using a soap-bubble flow meter. Table 1 below shows the permeance and selectivity of propylene over propane.

TABLE 1

| | |
|---|---|
| Permeance of propylene | 14.2 GPU |
| Permeance of propane | <0.1 GPU |
| Selectivity of propylene over propane | >142 |

EXAMPLE 2

The composite membrane of PEOx and silver hexafluorophosphate (AgPF$_6$) was prepared by using the method described in example 1. The concentration of PEOx aqueous solution used was 1 wt % and the weight ratio of AgPF$_6$ to PEOx was 2:1. The permeance of pure propylene and propane was determined by using the method indicated in example 1. Table 2 below shows the permeance and selectivity of propylene over propane.

TABLE 2

| | |
|---|---|
| Permeance of propylene | 11.2 GPU |
| Permeance of propane | <0.1 GPU |
| Selectivity of propylene over propane | >112 |

EXAMPLE 3

The composite membrane of PEOx and silver trifluoromethane acetate (AgCF$_3$CO$_2$) was prepared by using the method described in example 1. The concentraion of PEOx aqueous solution used was 1 wt % and the weight ratio of AgCF$_3$CO$_2$ to PEOx was 2:1. The permeance of pure propylene and propane was determined by using the method indicated in example 1. Table 3 below shows the permeance and selectivity of propylene over propane.

TABLE 3

| | |
|---|---|
| Permeance of propylene | 21.2 GPU |
| Permeance of propane | <0.1 GPU |
| Selectivity of propylene over propane | >212 |

EXAMPLE 4

The composite membrane of PEOx and silver trifluoromethane sulfonate (AgCF$_3$SO$_3$) was prepared by using the method described in example 1. The concentraion of PEOx aqueous solution used was 1 wt % and the weight ratio of AgCF$_3$SO$_3$ to PEOx was 2:1. The permeance of pure propylene and propane was determined by using the method indicated in example 1. Table 4 below shows the permeance and selectivity of propylene over propane.

TABLE 4

| | |
|---|---|
| Permeance of propylene | 37.7 GPU |
| Permeance of propane | <0.1 GPU |
| Selectivity of propylene over propane | >377 |

EXAMPLE 5

The composite membrane of PEOx and AgBF$_4$ was prepared by using the method described in example 1, except where the weight ratio of AgBF$_4$ to PEOx contained in the membrane was 4:1, which was higher than example 1. The permeance of pure propylene and propane was determined by using the method indicated in example 1. Table 5 below shows the permeance and selectivity of propylene over propane.

TABLE 5

| | |
|---|---|
| Permeance of propylene | 99.1 GPU |
| Permeance of propane | <0.1 GPU |
| Selectivity of propylene over propane | >991 |

As described above, the permeance of propylene in the membrane of the present example was increased in comparison to example 1. Thus, it can be seen that the solid state facilitated transport separation membrane prepared according to the invention is stable although it contains a high of amount of salt.

EXAMPLE 6

The composite membrane containing AgBF$_4$ salt was prepared by the same method as example 5, except where poly(vinyl pyrrolidone) (PVP) (Mw=1,000,000, T$_g$≈177°C., Polyscience) instead of PEOx was used as a polymer. The concentration of the PVP aqueous solution used was 1 wt % and the weight ratio of AgBF$_4$ to PVP was 4:1. The permeance of pure propylene and propane was determined by using the method indicated in example 1, except where the pressure of the feed was 20 psig. Table 6 below shows the permeance and the selectivity of propylene over propane.

TABLE 6

| | |
|---|---|
| Permeance of propylene | 218 GPU |
| Permeance of propane | <0.1 GPU |
| Selectivity of propylene over propane | >2180 |

EXAMPLE 7

The composite membrane of PVP and AgCF$_3$SO$_3$ was prepared by using the method described in example 6. The concentration of the aqueous solution used was 1 wt % and the weight ratio of AgCF$_3$SO$_3$ to PVP was 4:1. The permeance of propylene and propane was determined by using the method indicated in example 1. Table 7 below shows the permeance and the selectivity of propylene over propane.

TABLE 7

| | |
|---|---|
| Permeance of propylene | 183 GPU |
| Permeance of propane | <0.1 GPU |
| Selectivity of propylene over propane | >1830 |

COMPARATIVE EXAMPLE 1

The composite membrane of PEOx and silver nitrate (AgNO$_3$) was prepared by using the method described in example 5. The concentration of the aqueous solution used was 1 wt % and the weight ratio of $AgNO_3$ to PEOx was 4:1. The permeance of the pure propylene and propane was determined by using the method indicated in example 1, except where the pressure of the feed was 30 psig. Table 8 below shows the permeance and the selectivity of propylene over propane. Almost no selectivity is exhibited.

TABLE 8

| | |
|---|---|
| Permeance of propylene | 167 GPU |
| Permeance of propane | 158 GPU |
| Selectivity of propylene over propane | 1.06 |

EFFECTS OF THE INVENTION

The solid state facilitated transport separation membrane, prepared by coating a polymer electrolyte consisting of a suitable transition metal salt and a polymer onto a porous supported membrane in accordance with the present invention, can selectively separate the alkene-series hydrocarbons by facilitating the transport of alkenes, which results from a polymer ligand and a metal ion of metal salt in a polymer electrolyte forming a complex and from the double bond of alkenes selectively and reversibly reacting with the metal ions of a complex. In addition, the facilitated transport separation membrane of the invention is suitable for the practical separation process of alkanes/alkenes because the activity of the carrier is maintained even under completely dry conditions, and the long-term operation stability is high.

What is claimed is:

1. A solid state facilitated transport composite separation membrane for separation of alkenes from alkene/alkane mixtures, consisting of a porous supported membrane and a polymer electrolyte layer consisting of a polymer and a metal salt, wherein the composite separation membrane has an ideal selectivity expressed by of at least 100, wherein the polymer includes a repeat unit of alkyl oxazoline, N-vinyl pyrrolidone, acryl amide or N-isopropyl acryl amide.

2. The solid state facilitated transport separation membrane according to claim 1, wherein a metal of the metal salt is silver or copper.

3. The solid state facilitated transport separation membrane according to claim 1, wherein an anion of the metal salt is one of tetrafluoroborate, trifluoromethane acetate, trifluoromethane sulfonate and hexafluorophosphate.

4. The solid state facilitated transport separation membrane according to claim 1, wherein the metal salt is one of silver tetrafluroborate, silver trifluorosulfone acetate, silver trifluoromethane sulfonate and silver hexafluorophosphate.

5. The solid state facilitated transport separation membrane according to claim 1, wherein the porous supported membrane is a porous polymer membrane or a ceramic membrane.

6. A solid state facilitated transport composite separation membrane for separation of alkenes from alkene/alkane mixtures, consisting of a porous supported membrane and a polymer electrolyte layer consisting of a polymer and a metal salt, wherein the composite separation membrane has an ideal selectivity expressed by of at least 100, wherein an anion of the metal salt is one of trifluoromethane acetate, trifluoromethane sulfonate and hexafluorophosphate.

7. The solid state facilitated transport separation membrane according to claim 6, wherein a nitrogen atom is contained in a repeat unit of the polymer.

8. The solid state facilitated transport separation membrane according to claim 6, wherein an amide group is included in a repeat unit of the polymer.

9. The solid state facilitated transport separation membrane according to claim 6, wherein the polymer includes a repeat unit of alkyl oxazoline, N-vinyl pyrrolidone, acryl amide or N-isopropyl acryl amide.

10. The solid state facilitated transport separation membrane according to claim 6, wherein a metal of the metal salt is silver or copper.

11. The solid state facilitated transport separation membrane according to claim 6, wherein the metal is one of silver trifluorosulfone acetate, silver trifluoromethane sulfonate and silver hexafluorophosphate.

12. The solid state facilitated transport separation membrane according to claim 6, wherein the porous supported membrane is a porous polymer membrane or a ceramic membrane.

* * * * *